(12) United States Patent
Lichtinger et al.

(10) Patent No.: US 6,793,032 B2
(45) Date of Patent: Sep. 21, 2004

(54) SEATBELT FORCE SENSOR ASSEMBLY WITH GUIDE MEMBER

(75) Inventors: Harald Lichtinger, Auburn Hills, MI (US); Robert Graf, Pichl/Gsies (IT)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 310 days.

(21) Appl. No.: 09/964,875

(22) Filed: Sep. 27, 2001

(65) Prior Publication Data

US 2002/0043795 A1 Apr. 18, 2002

Related U.S. Application Data

(63) Continuation-in-part of application No. 09/853,338, filed on May 11, 2001, now Pat. No. 6,595,545.
(60) Provisional application No. 60/236,458, filed on Sep. 29, 2000.

(51) Int. Cl.$^7$ .............................................. B60R 21/32
(52) U.S. Cl. ....................................... 180/268; 280/735
(58) Field of Search ................................ 180/268, 271; 280/735, 801.1, 802, 808, 806; 701/45, 46, 47; 297/480, 483

(56) References Cited

U.S. PATENT DOCUMENTS

| | | | |
|---|---|---|---|
| 4,928,992 A | | 5/1990 | Qvint |
| 5,178,412 A | * | 1/1993 | Wier ........................ 280/801.1 |
| 5,413,378 A | | 5/1995 | Steffens, Jr. et al. |
| 5,431,447 A | | 7/1995 | Bauer |
| 5,454,591 A | | 10/1995 | Mazur et al. |
| 5,566,978 A | | 10/1996 | Fleming et al. |
| 5,626,359 A | | 5/1997 | Steffens, Jr. |
| 5,664,807 A | | 9/1997 | Bohmler |
| 5,732,974 A | * | 3/1998 | Sayles ........................ 280/805 |
| 5,855,047 A | | 1/1999 | Haas |
| 5,906,393 A | | 5/1999 | Mazur et al. |
| 6,079,745 A | | 6/2000 | Wier |
| 6,179,330 B1 | | 1/2001 | Wier |
| 6,209,915 B1 | * | 4/2001 | Blakesley ................. 280/801.1 |
| 6,264,236 B1 | * | 7/2001 | Aoki ........................... 280/735 |
| 6,301,977 B1 | * | 10/2001 | Stojanovski ............ 73/862.393 |
| 6,363,793 B2 | * | 4/2002 | O'Boyle ....................... 73/828 |
| 6,454,304 B1 | * | 9/2002 | Steffens, Jr. .............. 280/801.1 |

FOREIGN PATENT DOCUMENTS

| | | |
|---|---|---|
| DE | 38 17 042 A2 | 12/1988 |
| DE | 19648268 A1 | 5/1998 |
| EP | 0 656 283 B1 | 8/1997 |
| EP | 0 997 358 A2 | 5/2000 |
| GB | 1 275 571 | 5/1972 |
| GB | 2 309 483 A | 7/1997 |
| WO | WO 98/17508 | 4/1998 |
| WO | WO 99/12012 A1 | 3/1999 |
| WO | WO 99/27337 | 6/1999 |
| WO | WO 99/29538 | 6/1999 |

OTHER PUBLICATIONS

International Search Report, dated Jan. 3, 2002.

\* cited by examiner

*Primary Examiner*—Paul N. Dickson
*Assistant Examiner*—Laura B. Rosenberg

(57) ABSTRACT

A system for measuring seatbelt forces includes a guide that isolates a seatbelt force sensor 40 from input loads applied to the seatbelt at an angle. The system includes a rigid plate member 42 that supports the seatbelt force sensor 40, and which has one end attached to a portion of the seatbelt and an opposite end mounted to a guide bracket 70. The guide bracket 70 includes a pair of circular bosses 72 at one end for pivotally mounting the bracket 70 to a vehicle structure such as a B-pillar 68, for example. The bracket 70 guides the seatbelt in such a manner that input loads to the seatbelt that are applied at an angle do not affect the bending of the sensor 40.

18 Claims, 5 Drawing Sheets

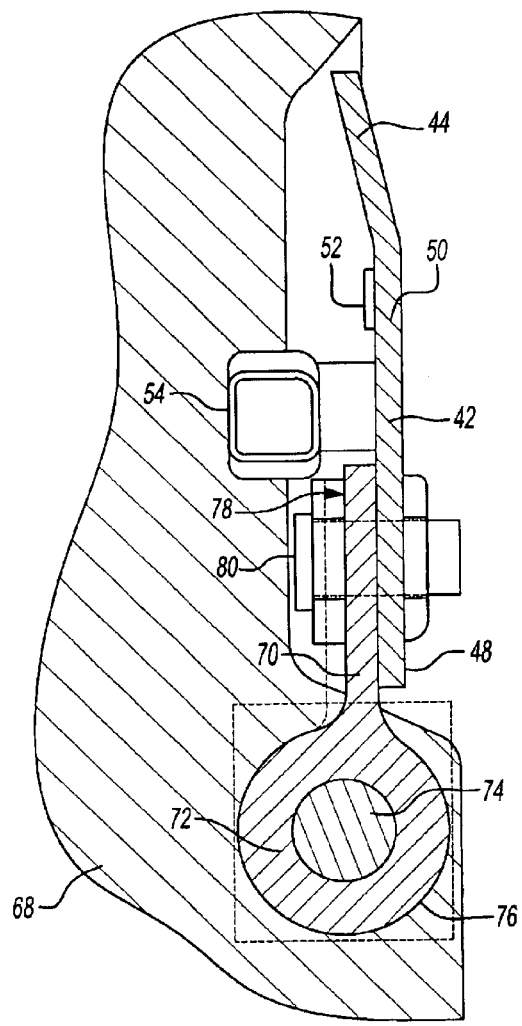
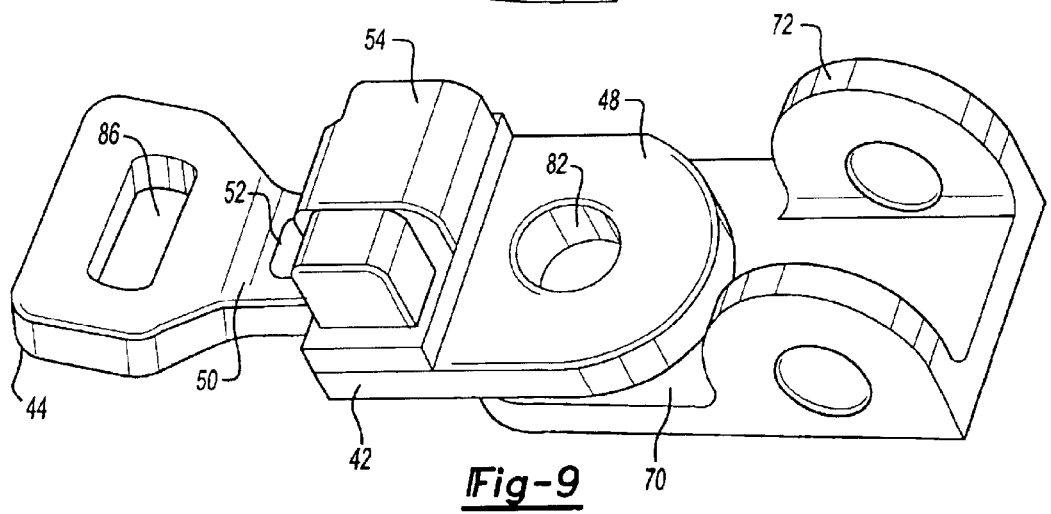

SEATBELT FORCE SENSOR ASSEMBLY WITH GUIDE MEMBER

RELATED APPLICATION

This application claims priority to provisional application 60/236,458 filed on Sep. 29, 2000 and is a continuation in part of application Ser. No. 09/853,338 filed on May 11, 2001.

BACKGROUND OF THE INVENTION

1. Field of the Invention

This invention relates to a method and apparatus for measuring the force applied to a seat belt. Specifically, a sensor arrangement is mounted on a rigid plate secured between a seatbelt portion and a vehicle structure and includes a guide member for guiding the seatbelt portion to isolate the sensor from input forces applied at an angle to the seatbelt portion, which increases the accuracy of the seatbelt force measurements.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is an infant seat or small adult/child secured to the vehicle seat then the airbag should not be deployed or should be deployed at a significantly lower deployment force. One way to control the airbag deployment is to monitor the weight of the seat occupant.

Current systems for measuring the weight of a seat occupant are complex and expensive. One type of system uses pressure sensitive foil mats mounted within the seat bottom foam. Another system uses sensors placed at a plurality of locations within the seat bottom. The combined output from the mats or the sensors is used to determine the weight of the seat occupant. The accuracy of the weight measurements from these types of sensor systems can be compromised due to additional seat forces resulting from the occupant being secured to the seat with a seatbelt.

For example, weight sensor systems can have difficulty identifying an adult, a child, or a car seat when the seatbelt is being used. When a child seat is secured to a seat with a seatbelt, an excess force acts on the sensors mounted within the rear portion of the seat bottom, which interferes with accurate weight sensing. Over tightening of the seatbelt to securely hold the child seat in place, pulls the child seat down against the rear part of the seat bottom, causing the excessive force measured by the sensors. Due to this effect, the current weight sensing systems have difficulty in discerning between an adult belted to a seat and a child seat secured to the seat with a seatbelt.

In order to address this problem, sensors have been incorporated into the seatbelt to measure the tension force applied to the seatbelt as passengers or a child seat is secured to the seat. High seatbelt tension forces indicate that a child seat is secured to the seat. One type of seatbelt force sensor is mounted on a rigid plate member having one end attached to a seatbelt portion. The sensor measures strain applied to the plate via the seatbelt. This type of sensor provides accurate measurements for input loads that are applied linear or axial direction. However, if the seatbelt is pulled or tightened at an undesirable angle, the sensor can provide less accurate measurements.

Thus, it is desirable to have a system for measuring seatbelt forces to determine whether a child seat or an adult is secured to the seat that utilizes a sensor that is isolated from non-axial movements, and which provides increased accuracy for seatbelt force measurements. The system should also work with traditional seat occupant weight sensing systems and be easy to install, as well as overcoming any other of the above referenced deficiencies with prior art systems.

SUMMARY OF THE INVENTION

A system for measuring seatbelt forces includes a rigid plate member that supports a seatbelt force sensor and a guide member for isolating the sensor from input forces applied to the seatbelt at undesirable angles. The method of measuring the seatbelt force includes the following steps. One end of the rigid plate member is mounted to a seatbelt portion and an opposite end of the rigid plate member is mounted to a vehicle structure. An input force is applied to the seatbelt portion. The seatbelt portion is guided by a guide member to isolate the seatbelt force sensor from input forces applied at an angle. The seatbelt force sensor generates an output signal that is representative of the force applied to the seatbelt portion. Preferably, the guide member is pivotally mounted at one end between the rigid plate member and the vehicle structure.

In a disclosed embodiment of this invention, the sensor assembly includes a rigid member having one end operably coupled to a seatbelt portion and a sensor mounted on the rigid member for measuring strain exerted on the rigid member by an input force applied to the seatbelt portion. The assembly further includes a bracket having a first mounting portion for attachment to the rigid member and a second mounting portion for attachment to a vehicle structure, such as a B-pillar, anchor side mount, or buckle side mount. This bracket defines a guide for isolating the sensor from non-axial input forces applied to the seatbelt portion. Preferably the first mounting portion is parallel to the rigid member and the second mounting portion is transverse to the rigid member.

In a disclosed embodiment, the second mounting portion includes a pair of bosses mounted on opposing sides of the bracket. Each of the bosses includes an aperture for supporting a pivot shaft. The bracket pivots about a pivot axis defined by the pivot shaft and relative to the vehicle structure. This configuration provides a guide for the seatbelt to eliminate angle effects on the sensor.

These and other features of the present invention can be best understood from the following specification and drawings, the following of which is a brief description.

BRIEF DESCRIPTION OF THE DRAWINGS

FIG. 8 is a side cross-sectional view of the sensor assembly mounted to a B-pillar.

FIG. 9 is a perspective view of the sensor assembly of FIG. 8.

DETAILED DESCRIPTION OF AN EXEMPLARY EMBODIMENT

Figure 1:
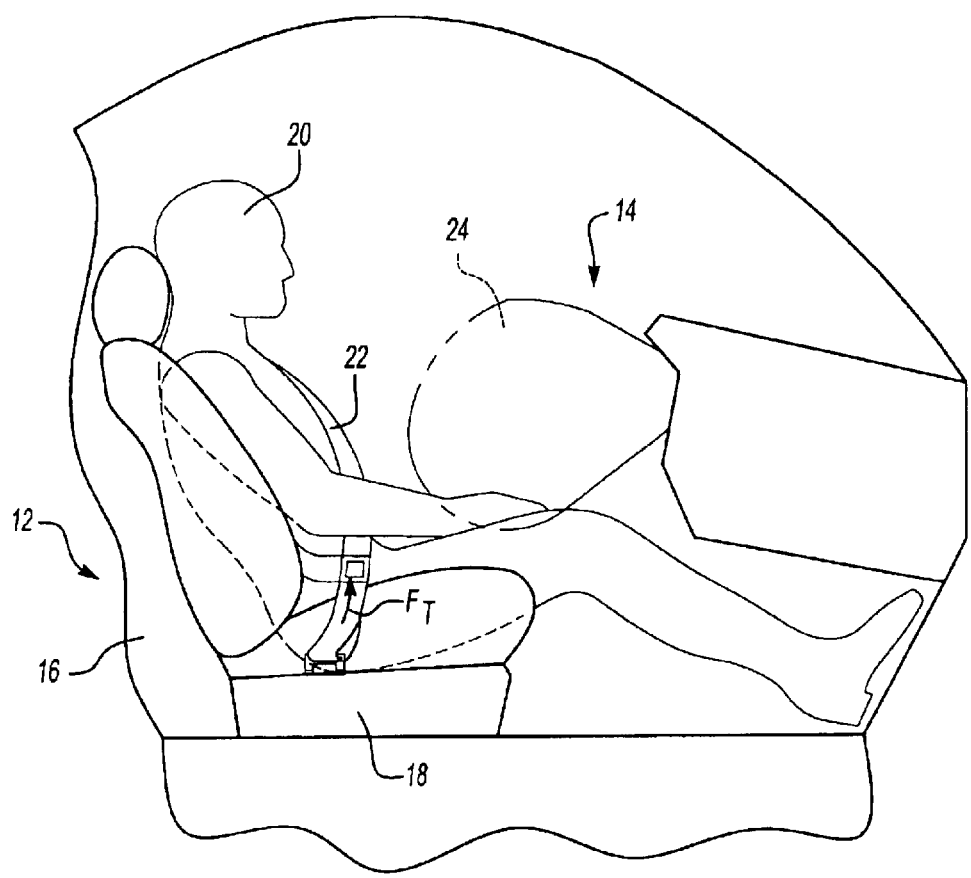
FIG. 1 is a schematic view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 is preferably a passenger seat and includes a seat back 16 and a seat bottom 18. A vehicle occupant 20 is secured to the seat 12 with a seatbelt 22. A tension force $F_T$ is exerted on the seatbelt 22. The tension force $F_T$ represents the force is exerted against the occupant as the belt is tightened.

Figure 2:
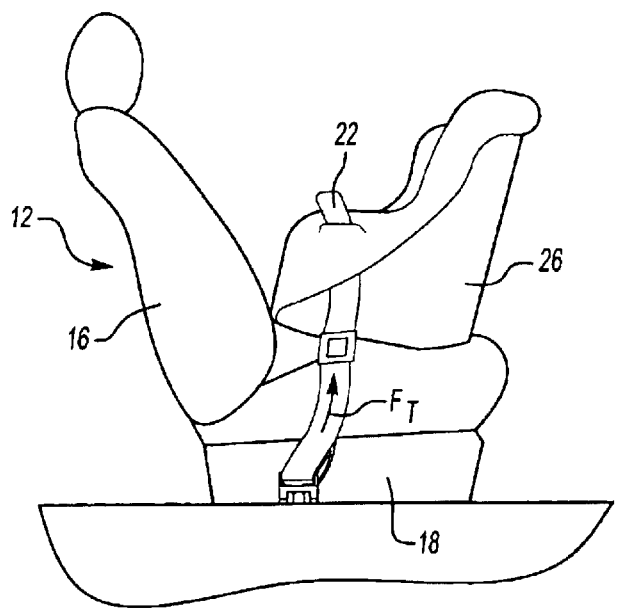
FIG. 2 is a schematic side view of a seat assembly with an infant car seat secured to the vehicle seat.

The airbag system 14 deploys an airbag 24 under certain collision conditions. The deployment force for the airbag 24, shown as deployed in dashed lines in FIG. 1, varies depending upon the type of occupant that is belted to the seat 12. When an adult vehicle occupant 20 is belted to the vehicle seat 12, the airbag 24 should be deployed in a normal manner shown in FIG. 1. If there is an infant or child seat 26 secured to the vehicle seat 12, see FIG. 2, then the airbag 24 should not be deployed. Thus, it is important to be able to determine whether there is an adult vehicle occupant 20 belted to the seat 12 or whether an infant or child seat 26 is secured to the seat 12 with a seatbelt 22. One way to determine this is by monitoring the tension exerted on the seatbelt 22. When an adult vehicle occupant 20 is belted to the seat, normal seatbelt forces are exerted against the seatbelt 22. When an infant or child seat 26 is belted to the seat 12, high tension forces are exerted on the seatbelt 22 because the seatbelt 22 is overtightened to securely hold the infant or child seat 26 in place.

Figure 3:
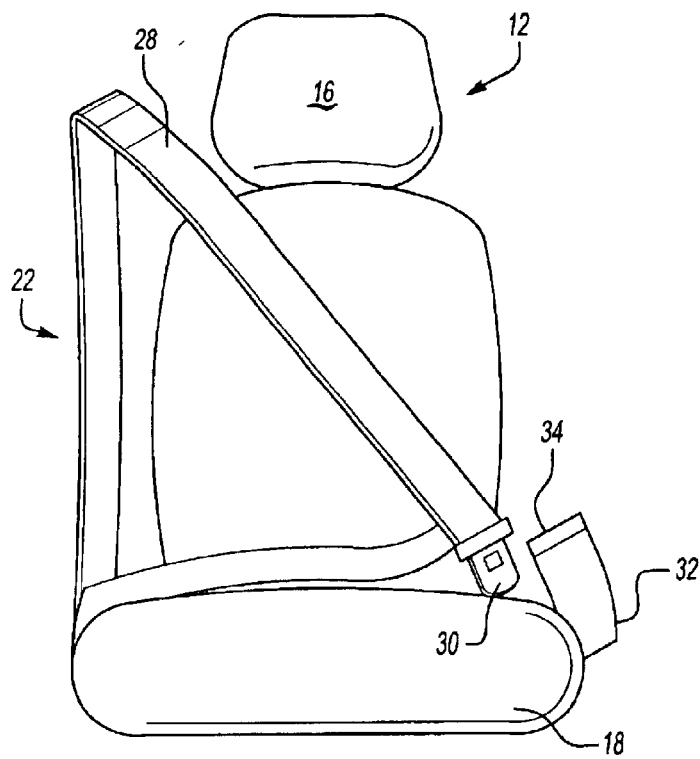
FIG. 3 is a schematic front view of a seat and seatbelt assembly.

The seatbelt 22, shown more clearly in FIG. 3, has a strap portion 28 that includes a shoulder harness and/or lap belt that is connected to a male buckle member 30. A seatbelt latch mechanism 32 is hard mounted to the seat 12 and typically extends outwardly from the seat 12 between the seat back 16 and the seat bottom 18. The latch mechanism 32 includes a female receptacle 34 that receives the male buckle member 30 to secure the occupant 20 or child seat 26 to the seat 12. The strap portion 28 can be manually or automatically tightened once the belt is buckled to a desired tension.

Figure 4:
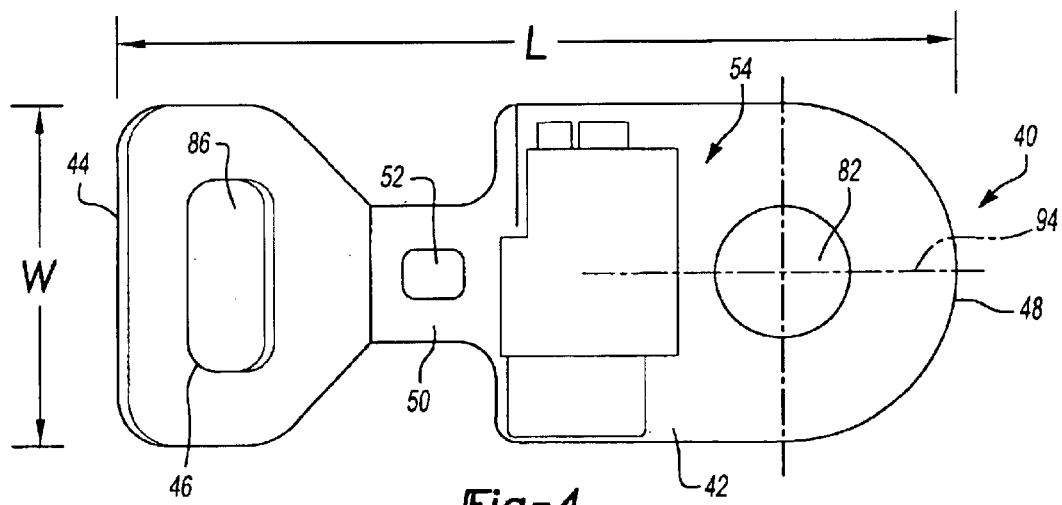
FIG. 4 is an overhead view of subject sensor assembly.
Figure 5:
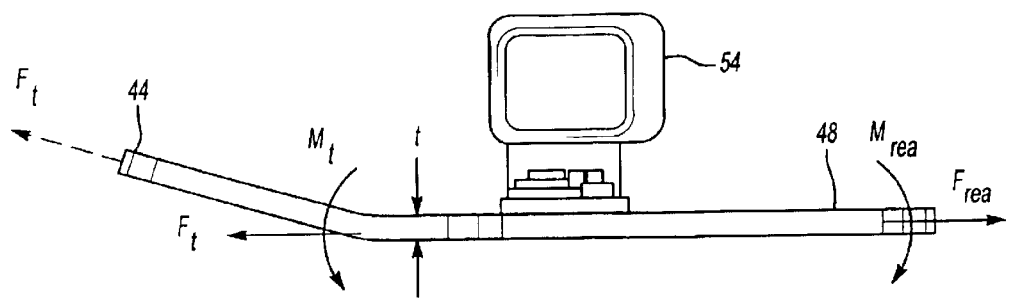
FIG. 5 is a side view of the sensor of FIG. 4.

A sensor assembly 40 for measuring the tension forces in the seatbelt 22 is shown in FIGS. 4 and 5. The sensor assembly 40 includes a rigid member that is preferably formed as a metallic plate 42 from 4130Rc39 material, however, other similar materials could also be used. The plate 42 includes a first end 44 that is attached via a loop connection 46 to material that forms a portion of the seatbelt 22 and a second end 48 that is attached to a vehicle structure. The vehicle structure attachment will be discussed in greater detail below.

The plate 42 is defined by a length "l", a width "w", and a thickness "t". In the preferred embodiment, the length l is greater than the width w and the thickness t is significantly less than the width w and the length l. The plate 42 includes a necked portion 50 positioned between the ends 44, 48 that is narrower than the ends 44, 48. A strain gage 52 is mounted on the necked portion 50. The tightening of the seatbelt 22 exerts a tension force $F_T$ on the plate 42 via the looped connection 46, which results in strain on the necked portion 50. The strain gage 52 measures this strain. The strain gage 52 is preferably a full bridge strain gage with four (4) grids.

The first end 44 of the plate 42 is preferably positioned at an angle relative to the necked portion 50 and the second end 48. This causes the tension force to be applied at an angle, which creates a moment $M_T$ at one edge of the necked portion 50. The second end 48 of the plate 42 is hard mounted to a vehicle structure creating a reaction force $F_{rea}$ and moment $M_{rea}$. The strain gage 52 measures the strain resulting in the necked portion 50 of the plate 42 as the tension force $F_T$ is applied to the first end 44 of the plate 42.

Figure 6:
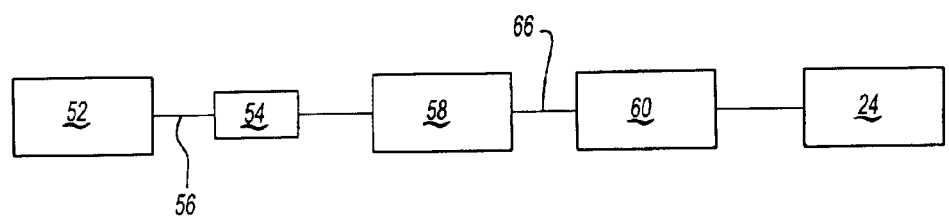
FIG. 6 is schematic diagram of the control system.
Figure 7:
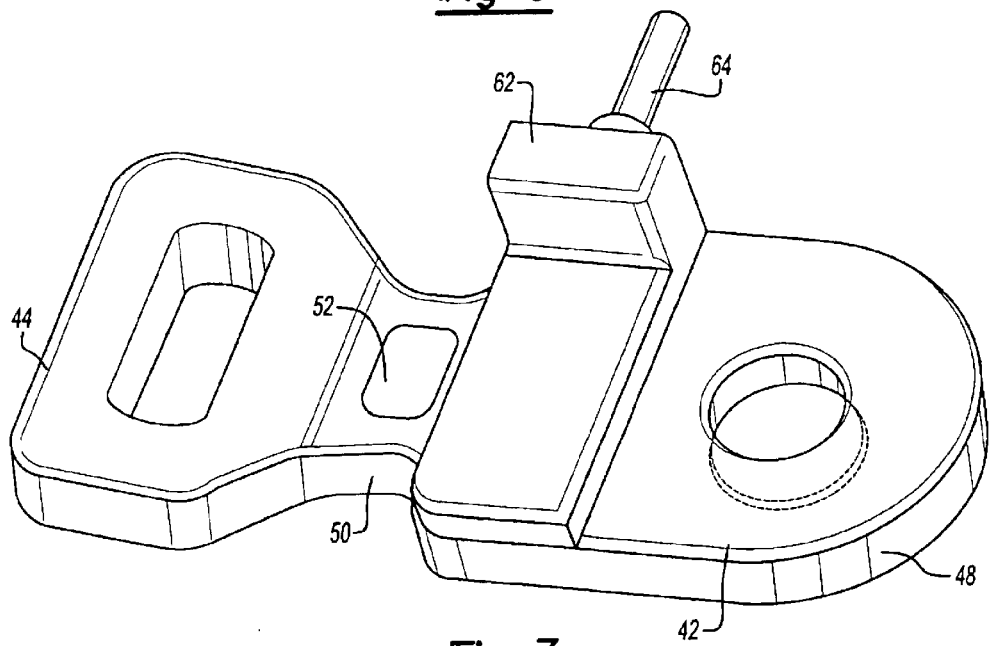
FIG. 7 is a perspective view of an alternate embodiment of the sensor assembly.

An electrical connector 54 is also mounted on the plate 42 adjacent to the strain gage 52. The strain measurements are generated as signals 56 that are sent from the gage 52 to the connector 54 and then to an electronic control unit (ECU) or microprocessor 58, see FIG. 6. The ECU 58 can be incorporated into the connector 54 to include the necessary electronics and printed circuit board (as shown in FIG. 4) or can be a separate component at a remote location on the vehicle. The ECU 58 processes the strain signals 56 to determine the magnitude of the tension forces $F_T$ exerted on the seatbelt 22 and sends a control signal 66 to a central electronic control unit (ECU) or central microprocessor 60 to control deployment of the airbag 24. It should be understood that the ECU 58 and the central ECU 60 could be separate units or could be the same unit. An optional configuration for an electrical connector 62 is shown in FIG. 7. This configuration includes a simplified wire connection 64 to the ECU 58 and/or 60.

Figure 10:
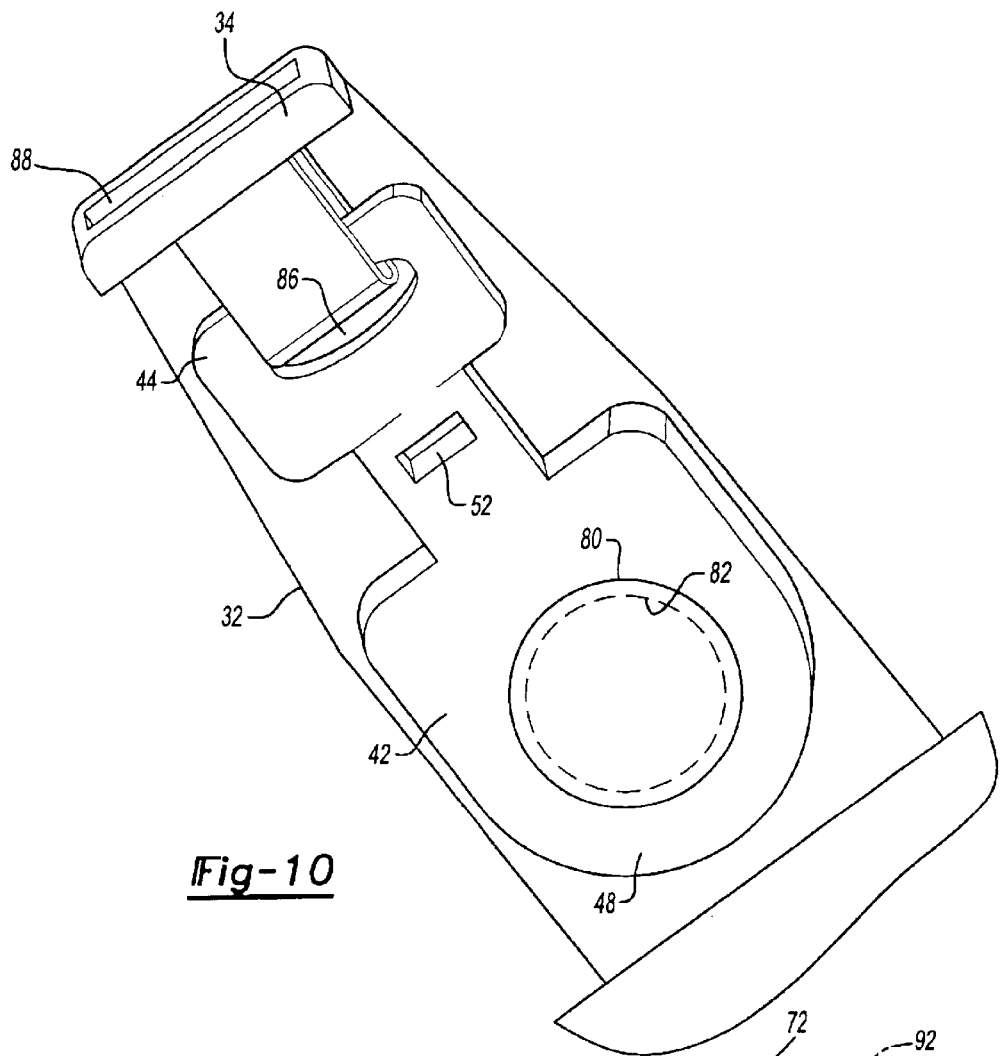
FIG. 10 is a perspective view, partially cut-away, of the sensor assembly mounted in a seat latch mechanism.

As discussed above, the plate 42 is hard mounted to a vehicle structure. The vehicle structure can be a B-pillar 68 as shown in FIGS. 8 and 9 or the seatbelt latch mechanism 32 as shown in FIG. 10. The B-pillar 68 extends vertically to one side of the vehicle and is typically positioned adjacent to the seat 12 and behind a front passenger door of the vehicle. For a side mount, such as the B-pillar, side anchor, or side buckle mount a secondary metal plate or bracket 70 is included to provide a guide for the seatbelt 22. The bracket 70 includes at least one circular boss 72 for receiving a pivot pin or shaft 74 at one end 76. Preferably, a pair of bosses 72 are mounted on opposite sides of the bracket, which include openings 90 for receiving the pivot pin 74. One end 78 of the secondary metal plate 70 includes an opening 96 that is overlaid and aligned with opening 82 of the rigid metal plate 42 to receive at least one fastener 80. The one mounting portion end 78 of the bracket 70 is preferably parallel to the rigid metal plate 42 while the other mounting portion including the bosses 72 is preferably non-parallel or transverse to the rigid metal plate 42.

The bracket 70 pivots about an axis 92 defined by the openings 90 and the pivot shaft 74 relative to the vehicle structure. The rigid metal plate 42 defines an axial input load force axis 94 (see FIG. 4) and the pivot axis 92 is transverse to this axial input load force axis 94. This configuration provides a guide for the seatbelt 22 and eliminates adverse effects on the strain gage 52 due to loads applied at undesirable angles to the seatbelt 22.

The seatbelt latch mechanism 32 mount is shown in FIG. 10. The second end 48 of the plate 42 includes the opening 82 for receiving the fastener 80 to hard mount the plate 42 to the seat. The opposite end 44 of the plate 42 has an elongated slot 86 for connecting the plate 42 to the looped material, which extends to the female receptacle 34 having a slot 88 for receiving the male buckle member 30.

In both configurations, the strain gage 52 measure the strain caused by the tension force $F_T$ in the seatbelt 22. The airbag deployment is controlled based upon the strain measurements and the airbag 24 is not deployed if the tension force $F_T$ exceeds a predetermined limit. An adult can experience a tension force in a seatbelt up to approximately 30 pounds (lbs) and still be comfortable. If the strain gage 52 measures a tension force $F_T$ that exceeds 30 lbs than that would indicate that a child seat 26 has been belted to the seat 12. Thus, the airbag 24 would not be deployed during a collision under these conditions. It should be understood that 30 lbs is an approximate value, which can vary due to differing seat and seatbelt configurations. Thus, the predetermined limit for comparison to the measured tension force $F_T$ can also vary depending upon the seat configuration.

Figure 11:
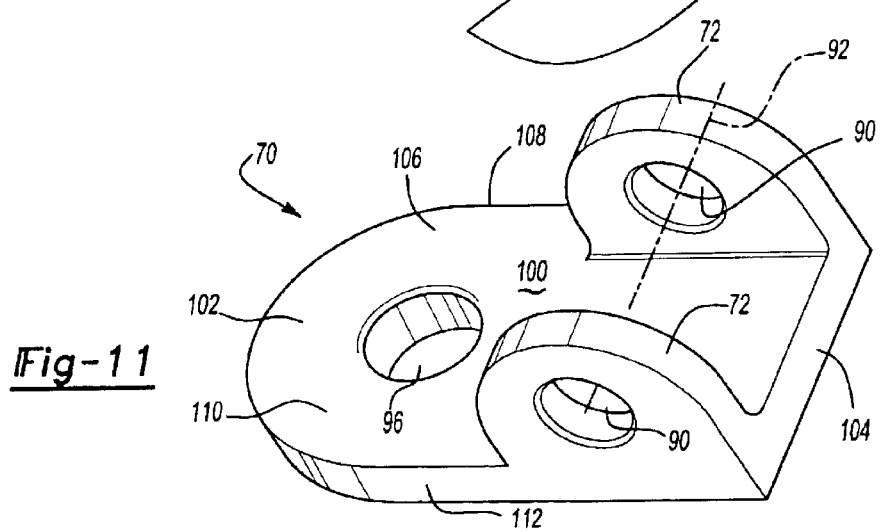
FIG. 11 is a perspective view of the bracket of FIGS. 8 and 9.

The bracket 70 is shown in greater detail in FIG. 11. The bracket 70 includes a generally flat body portion 100 that is defined by a first end 102, a second end 104, a first side 106 interconnecting the first 102 and second 104 ends to define a first edge 108, and a second side 110 interconnecting the first 102 and second 104 ends to define a second edge 112 opposite from the first edge 108. The bosses 72 each extend outwardly along a portion of the first 108 and second 112 edges. The bosses 72 with aligned openings 90 support the pivot shaft 74 at the second end 104 and the body portion 100 is attached to the rigid metal plate 42 at the first end 102.

The subject sensing system provides simplified and efficient apparatus and method for determining whether conditions are proper for deploying an airbag 24 by measuring seatbelt forces to discern whether a child in a child seat 26 or an adult is belted to the seat 12. The system provides accurate measurements and is easy to install.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A mounting assembly for a seatbelt tension sensor comprising:
    a rigid member having one end operably coupled to a seatbelt portion;
    a sensor mounted on said rigid member for measuring strain exerted on said rigid member by an input force applied to the seatbelt portion; and
    a bracket having a first mounting portion for attachment to said rigid member and a second mounting portion for attachment to a vehicle structure to define a guide for isolating said sensor from non-axial input forces applied to the seatbelt portion wherein said first mounting portion is parallel to said rigid member and said second mounting portion is non-parallel to said rigid member and wherein said second mounting portion includes a pair of bosses mounted on opposing sides of said bracket, each of said bosses including an aperture for supporting a pivot shaft.

2. An assembly according to claim 1 wherein said second mounting portion is perpendicular to said rigid member.

3. An assembly according to claim 1 wherein said rigid member defines an axial input load force axis and said pivot shaft defines a pivot axis that is transverse to said axial input load force axis.

4. An assembly according to claim 1 including an electrical connector mounted to said rigid member adjacent to said sensor for receiving strain measurements from said sensor and transmitting said measurements to a central processor to determine the magnitude of said input force.

5. An assembly according to claim 4 wherein said rigid member is a plate having a first end for attachment to said first mounting portion and a second end operably coupled to the seatbelt portion, said first and second ends being interconnected by a neck portion having a width that is less than the width of said first and second ends and wherein said sensor is mounted on said neck portion.

6. An assembly according to claim 5 wherein said first end defines a first opening and said first mounting portion defines a second opening, wherein said first end is overlaid on said first mounting portion to align said first and second openings.

7. An assembly according to claim 6 wherein said electrical connector is mounted to said rigid member adjacent to said second end between said first opening and said neck portion.

8. An assembly according to claim 1 wherein said vehicle structure is a B-pillar.

9. A bracket for a seatbelt force sensor assembly comprising:
    a generally flat body portion for supporting a seatbelt force sensor assembly, said body portion being defined by a first end, a second end, a first side interconnecting said first and second ends to define a first edge, and a second side interconnecting said first and second ends to define a second edge opposite from said first edge; and
    a plurality of boss portions including at least a first boss portion extending outwardly along a portion of said first edge and a second boss portion extending outwardly along a portion of said second edge, said first and second boss portions including circular openings aligned with one another for supporting a pivot shaft wherein said body portion and said boss portions define a guide and wherein said first end includes a mounting portion for attachment to the seatbelt force sensor assembly and said first and second boss portions are positioned adjacent to said second end for attachment to a vehicle structure and to define a guide for isolating the sensor assembly from non-axial input forces.

10. A bracket according to claim 9 wherein said body portion pivots about a pivot axis defined by said pivot shaft and relative to said vehicle structure.

11. A bracket according to claim 10 wherein said vehicle structure is a B-pillar.

12. A bracket according to claim 10 wherein said vehicle structure is a side anchor mount.

13. A method of measuring a seatbelt force comprising the steps of:
    mounting a seatbelt force sensor to a rigid plate member;
    mounting one end of the rigid plate member to a seatbelt portion;
    mounting an opposite end of the rigid plate member to a vehicle structure;
    pivotally mounting a guide member at one end between the rigid plate member and the vehicle structure;
    applying an input force to the seatbelt portion;
    isolating the seatbelt force sensor from input forces applied at an angle by guiding the seatbelt portion with the guide member; and
    generating an output signal from the seatbelt force sensor representative of the force applied to the seatbelt portion.

14. A method according to claim 13 including the step of measuring strain exerted on the rigid plate member by the input force with the seatbelt force sensor.

15. A method according to claim 13 including the step of pivoting the guide member about an axis defined by a pivot shaft extending between a pair of bosses.

16. A mounting assembly for a seatbelt tension sensor comprising:

a rigid member having one end operably coupled to a seatbelt portion;

a sensor mounted on said rigid member for measuring strain exerted on said rigid member by an input force applied to the seatbelt portion; and a bracket having a first mounting portion for attachment to said rigid member and a second mounting portion for attachment to a vehicle structure to define a guide for isolating said sensor from non-axial input forces applied to the seatbelt portion wherein said first mounting portion is parallel to said rigid member and said second mounting portion is non-parallel to said rigid member and wherein said second mounting portion defines a pivot axis extending from a first side edge to a second side edge of said bracket.

17. A mounting assembly for a seatbelt tension sensor comprising:

a rigid member having one end operably coupled to a seatbelt portion;

a sensor mounted on said rigid member for measuring strain exerted on said rigid member by an input force applied to the seatbelt portion; and a bracket having a first mounting portion for attachment to said rigid member and a second mounting portion for attachment to a vehicle structure to define a guide for isolating said sensor from non-axial input forces applied to the seatbelt portion wherein said first mounting portion is parallel to said rigid member and said second mounting portion is non-parallel to said rigid member and wherein said first mounting portion comprises a fixed attachment interface between said bracket and said rigid member.

18. A bracket for a seatbelt force sensor assembly comprising:

a generally flat body portion for supporting a seatbelt force sensor assembly, said body portion being defined by a first end, a second end, a first side interconnecting said first and second ends to define a first edge, and a second side interconnecting said first and second ends to define a second edge opposite from said first edge; and a plurality of boss portions including at least a first boss portion extending outwardly along a portion of said first edge and a second boss portion extending outwardly alone a portion of said second edge wherein said first and second boss portions define a pivot attachment and said body portion and said boss portions define a guide and wherein said first end includes a mounting portion for attachment to the seatbelt force sensor assembly and said first and second boss portions are positioned adjacent to said second end for attachment to a vehicle structure and to define a guide for isolating the sensor assembly from non-axial input forces.

* * * * *